Patented May 23, 1950

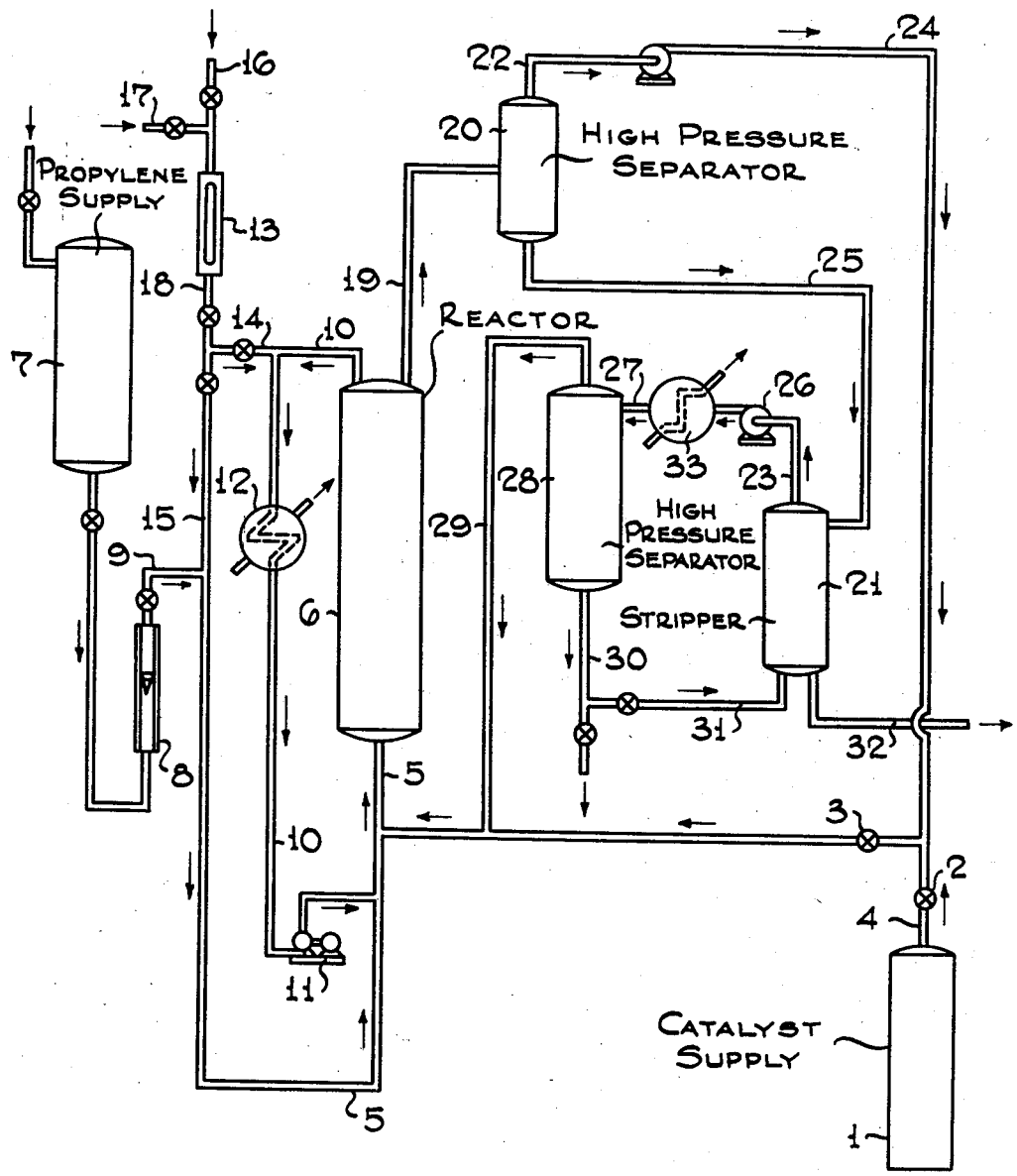

2,508,744

UNITED STATES PATENT OFFICE 2,508,744

PROPYLENE POLYMERIZATION

Carl S. Carlson and Robert S. Merrington, Elizabeth, and Frank A. Biribauer, Cranford, N. J., assignors to Standard Oil Development Company, a corporation of Delaware Application December 30, 1947, Serial No. 794,590

6 Claims. (Cl. 260—683.15)

This invention relates to an improved process for the selective production of valuable low molecular weight propylene polymers. More particularly, it is concerned with an improvement in the method of effecting and controlling the polymerization of propylene in the presence of a Friedel-Crafts type catalyst in a process designed to obtain a high conversion of the propylene monomer to propylene polymers containing 9 to 24 carbon atoms per molecule.

Propylene has been polymerized by a process in which water and oxygen-containing polar organic compounds are used in small proportions as activators under suitable conditions in regulated quantities for obtaining high yields of $C_9$ to $C_{24}$ propylene polymers during a controlled catalytic polymerization of propylene.

The oxygen-containing polar organic compounds useful for obtaining the controlled catalytic polymerization of propylene belong to many classes of oxygenated organic compounds, such as ethers, alcohols, ketones, aldehydes, acids and esters. In addition, the organic O, H and C compounds may contain other substituents such as nitrogen, sulfur or halogens. Polyfunctional compounds such as glycols, glycerine, polyglycol ethers, keto acids and the like have also been employed to control the polymerization of propylene.

The oxygen-containing polar organic compound is admixed in a properly adjusted small quantity, not exceeding the molar proportion of the catalyst to bring about polymerization of the propylene to a controlled level. When the molar quantity of the polar compound exceeds the molar quantity of the catalyst in the reaction mixture, polymerization stops.

The propylene feed consists of substantially pure propylene, or may be a mixture containing $C_1$ to $C_3$ hydrocarbons as in light refinery gases, or a mixture essentially propane-propylene such as a refinery propane-propylene cut. The propylene feed may also be diluted with higher paraffinic hydrocarbons such as butanes, pentanes and hexanes which are inert under the reaction conditions.

Polymerization reaction conditions suitable for the controlled polymerization of propylene to its $C_9$ to $C_{24+}$ polymers are such that in the absence of the activator, the catalyst fails to effect formation of these polymers in any substantial yield at operative time intervals and pressures. The propylene undergoing the controlled polymerization is preferably maintained in liquid phase at temperatures ranging from 0° C. to 91.4° C. by applying sufficient pressure in the range of 10 to 750 atmospheres or higher.

Elevated pressure (above minimum required for liquefaction) confers advantages to this process in the following manner:

1. The ratio of the partial pressure of $BF_3$ catalyst to the total system pressure is reduced, thereby decreasing the amount of $BF_3$ swept out of the system.
2. The solubility of the $BF_3$ gas in the hydrocarbon mixture is increased, thus improving contact between feed and catalyst.
3. The equilibrium is shifted in favor of propylene polymer formation since this reaction involves a reduction in volume.

The reaction may be conducted also with the propylene in the gaseous state at temperatures above the critical temperature of propylene. The maximum reaction temperature is below the temperature at which the polymers decompose and preferably no higher than 150° C.

The catalyst employed in the controlled polymerization of propylene, for the purposes of the present invention is boron fluoride, which effects little or no substantial polymerization of liquid propylene at temperatures between 0–100° C. in intervals such as an hour in the absence of the oxygen-containing compounds used as a promoter.

The amount of the $BF_3$ catalyst required varies from a small quantity, i. e. 1 mole percent with respect to the propylene feed to an equi-molar proportion or higher. An increase in the amount of catalyst has the effect of speeding up the polymerization. Very rapid selective polymerization of propylene has been obtained with the catalyst in a larger molar proportion than the propylene feed, and this effectiveness of the catalyst depends on the extent to which the catalyst is maintained in intimate contact with the feed.

There are some distinct advantages therefore obtained by the use of the higher concentrations of catalyst. The use of the increased quantities of this expensive catalyst, however, greatly increases the cost of the operation. In addition, the normal catalyst losses are greatly multiplied by the use of these larger quantities. The cost of the process would be considerably reduced by an efficient means of catalyst recovery.

An object of this invention is to provide a continuous process for the catalytic polymerization of propylene wherein the total amount of catalyst used for optimum operation is substantially reduced. Another object is to provide a process wherein the catalyst losses are rendered almost negligible, while the propylene conversion is kept at a high level. Still another object is to provide a process employing a rapid, inexpensive means of catalyst recovery.

This invention is an improvement in the catalytic polymerization of propylene with $BF_3$ catalyst activated by an oxygen-containing compound, said improvement comprising conducting the polymerization at high pressures with the propylene in gas or liquid phase, but preferably the latter, continuously withdrawing the reaction mixture from the reaction zone to a high pressure zone maintained at a temperature such that a major portion of the unreacted gases is maintained dissolved or in the liquid phase, recycling the catalyst in substantially pure gaseous form to the reaction zone, subsequently reducing the pressure of the residual products so that the $C_3$ hydrocarbons and lower boiling products are volatilized and made available either for return to the reaction zone or for further removal of catalyst from the liquid polymers.

This invention will be better understood from the following discussion of a specific embodiment.

In the flow diagram is illustrated a simplified diagram of a unit in which this invention is utilized for a controlled continuous polymerization of propylene.

Referring to the drawing, gaseous $BF_3$ catalyst is supplied from tank 1 through flow control valves 2 and 3 in line 4 to inlet 5 of the reactor 6. Liquefied propylene feed is supplied from tank 7 through flow meter 8 in line 9 to inlet 5 of the reactor 6. The mixture of catalyst and propylene feed flows into the reactor 6. The reactor is maintained in the above indicated pressure range. A portion of the resulting reaction mixture is recirculated from the outlet end of the reactor 6 through line 10 by pump 11 back to the inlet 5, and during the recycling, the mixture is passed through a heat exchanger 12, wherein the recirculated mixture is brought back to approximately the reaction zone temperature. The products in reactor 6 are agitated to bring the catalyst into intimate contact with the feed.

A regulated amount of oxygen-containing organic compound is supplied from blow case 13 through valve-controlled line 15 to line 9 for admixture with the propylene feed or through valve-controlled line 14 to line 10 for addition to the recycled reaction mixture. Blow case 13 is provided with a valved inlet 16 for the oxygen-containing organic compound and valved inlet 17 for pressure gas. Adjustment of the outlet valve 18 and of valves in lines 14 and 15 regulates introduction of the activating compound into the feed or reaction mixture.

After the unit is brought into operation, a portion of the mixture reaching the outlet end of reactor 6 is passed through overflow line 19 into high pressure separator 20 maintained at the same pressure range as reactor 6. The pressure is sufficient to maintain the unconverted propylene, other hydrocarbons, activator and polypropylene in the liquid state. The gaseous catalyst taken overhead through line 22 is recycled by line 24 to reactor 6. The liquid remaining product is sent from the bottom of the separator 20 through a pressure reducing valve in line 25 and into a stripper 21, which is at atmospheric pressure. The polymers and activator are thereby maintained in the liquid state but the propane, propylene, lower boiling hydrocarbons and the small amounts of $BF_3$ which may have dissolved in the liquid polymers are taken off overhead through line 23, compressed by compressor 26, cooled in cooler 33, and sent through line 27 to a second high pressure separator 28 maintained at the same pressure range as the first high pressure separator 20. The liquefied propane and propylene containing dissolved any lower boiling hydrocarbons present are withdrawn from the bottom of the separator 28 through line 30, and a portion passed through a pressure-reducing valve in line 31, and sent back to the stripper 21 as a gas. The product in stripper 21 is heated to 50–100° C. in order to minimize the solution of the circulating hydrocarbon gases in the polypropylene without vaporizing the lower boiling fraction of the latter. The gases bubble through the liquid polymers and thereby sweep out even the slight remaining amounts of catalyst still dissolved therein. The vapors are then removed through line 23 in a continuous operation. The slight remaining amounts of catalyst are returned to the reactor 6 through line 29.

The liquid polymer product and oxygen-containing compound are withdrawn from the bottom of the stripper 21 through line 32 for separation and fractionation elsewhere.

Excess $C_3$ and other gases may be bled off through line 30 or recycled to the reaction zone 6 if desired.

In a preferred mode of operating a continuous unit for preparing the low molecular weight propylene polymers, liquid propylene is admixed at a constant feed rate with the catalyst and with the oxygen-containing compound which functions to activate or control the catalyst; the resulting reaction mixture is recirculated through the reaction zone, as in reactor 6, while exothermic heat of reaction is removed to establish steady reaction conditions; then while steady reaction conditions are maintained, liquid polymer oil is withdrawn, e. g., through overflow pipe 19, from the reaction zone continuously at a lower volumetric rate than the volumetric feed rate of the liquid propylene continuously entering the inlet 5 of the reactor 6.

The feed and the catalyst may enter the reaction zone as separate streams. The activator may be added continuously or intermittently in separate stream or with the other feed streams.

When the polymerization is conducted with the propylene in the gaseous phase the reaction mixture leaving the reactor 6 through line 19 is cooled to below the critical temperature of $C_3$ hydrocarbons.

The pressure in the separators 20 and 28 is maintained at a point sufficient to maintain $C_3$ hydrocarbons either in the liquid phase or dissolved in the reaction products.

The pressure in the stripper 21 is below that maintained in the separating zones and if desirable may be kept at subatmospheric pressure.

Since most of the catalyst is recovered in the first separation zone, the further recovery and treatment may be dispensed with depending upon the economics of the operation.

Although the preferred commercial operation is a continuous liquid phase system as described, semi-continuous systems may be used. Inert diluents may also be fed to the system if desired.

Inert low boiling diluents such as $C_1$ and $C_2$ fractions are much more soluble in the polypropylene polymers than is $BF_3$. The major portion of these gases, if present in the feed, are removed in stripper 21 and are then made available for recovering additional $BF_3$.

Experimental data were obtained in the production of propylene polymers by the method of this invention and are presented in the following table:

TABLE I

*Propylene polymerization in continuous unit*

Feed: 85 per cent propylene—15 per cent propane
Pressure: 14 atmospheres
Catalyst 4 mol. per cent $BF_3$
Activator 0.5 vol. per cent isopropyl ether
Reactor temperature: 18° C.
Propylene feed rate, v./v./hr. 1
Wt. per cent conversion on propylene 98

Product distribution
[B. pt. at 760 mm. Hg, °C.]

| | |
|---|---|
| $C_9$, 125–165 | 0 |
| $C_{12}$, 165–220 | 6 |
| $C_{15}$, 220–280 | 17 |
| $C_{18}$, 280–320 | 32 |
| $C_{21}$, 320–350 | 20 |
| $C_{24+}$, 350+ | 25 |

90% of the $BF_3$ used was recovered through the use of the first high pressure separator and the low pressure scrubber and stripper. The major proportion of the catalyst was regenerated by the high pressure separation operation.

The reduced cost resulting from the saving of catalyst is of distinct importance because of the increased utilization of the polymers produced by this process as lube oil additives, synthetic lube oil starting materials, detergents, cable oils and for other purposes.

What is claimed is:

1. In a process for selectively polymerizing propylene in a liquid $C_3$ hydrocarbon fraction with gaseous $BF_3$ as catalyst activated by a small amount of a liquid oxygen-containing compound the improvement comprising polymerizing the liquid propylene in a reaction zone, removing a resulting reaction mixture comprising liquid propylene polymer product, liquid $C_3$ hydrocarbons, the liquid oxygen-containing compound and $BF_3$ catalyst from the reaction zone to a separation zone maintained at a pressure and temperature that maintain $C_3$ hydrocarbons in the liquid phase with a minor proportion of $BF_3$ catalyst dissolved therein, withdrawing gaseous catalyst substantially free of organic compounds from the separation zone and recycling the thus withdrawn catalyst to the reaction zone.

2. In a process as in claim 1 wherein the reaction zone is maintained at a pressure of above 10 atmospheres.

3. In a process for selectively polymerizing propylene in a liquid $C_3$ hydrocarbon fraction at a temperature below 91.4° C. with $BF_3$ as catalyst activated by a small amount of an oxygen-containing polar organic compound the improvement comprising polymerizing the propylene in a reaction zone at a pressure that maintains $C_3$ hydrocarbons in the liquid phase, removing a resulting reaction mixture of liquid organic compounds with catalyst from the reaction zone to a separation zone maintained at a pressure of at least 10 atmospheres and at a temperature sufficiently low for liquefying $C_3$ hydrocarbons and maintaining a minor proportion of $BF_3$ catalyst dissolved therein, withdrawing gaseous catalyst substantially free of organic compounds from said separation zone, and recycling the thus withdrawn gaseous catalyst to the reaction zone.

4. In a process for selectively polymerizing propylene in a liquid $C_3$ hydrocarbon fraction at a temperature below 91.4° C. with gaseous $BF_3$ as catalyst activated by a small amount of a liquid oxygen-containing polar organic compound, the improvement comprising polymerizing the liquid propylene in a reaction zone at a pressure that maintains $C_3$ hydrocarbons in the liquid phase, removing a resulting reaction mixture of liquid organic compounds with catalyst from the reaction zone to a separation zone maintained at a pressure of at least 10 atmospheres and at a temperature sufficiently low for liquefying $C_3$ hydrocarbons and having a minor proportion of the $BF_3$ catalyst dissolved therein, withdrawing gaseous catalyst substantially free of organic compounds from said separation zone, recycling the thus withdrawn gaseous catalyst to the reaction zone, withdrawing residual liquid product from the separation zone to a reduced pressure stripping zone, releasing a resultant gaseous mixture of $C_3$ hydrocarbons and gaseous catalyst from said stripping zone, liquefying $C_3$ hydrocarbons of said gaseous mixture, sending a resultant mixture of thus liquefied $C_3$ hydrocarbons and gaseous catalyst to a second separation zone wherein the liquefied $C_3$ hydrocarbons are separated from the gaseous catalyst, withdrawing residual gaseous catalyst from the second separation zone and recycling said residual gaseous catalyst to the reaction zone.

5. In a process for selectively polymerizing propylene as in claim 4, the additional steps comprising withdrawing residual liquid product from the second separation zone, volatilizing said residual liquid product under reduced pressure, and injecting the thus volatilized residual product into the stripping zone to sweep additional catalyst from the product contained therein.

6. In a process for selectively polymerizing propylene as in claim 5, said product in the stripping zone being maintained at a temperature of from 50°–100° C.

CARL S. CARLSON.
ROBERT S. MERRINGTON.
FRANK A. BIRIBAUER.

REFERENCES CITED

The following references are of record in the file of this patent:

UNITED STATES PATENTS

| Number | Name | Date |
|---|---|---|
| 2,221,000 | Kuentzel et al. | Nov. 12, 1940 |
| 2,278,445 | Hull | Apr. 7, 1942 |
| 2,301,052 | Kirn et al. | Nov. 3, 1942 |

FOREIGN PATENTS

| Number | Country | Date |
|---|---|---|
| 801,883 | France | Aug. 20, 1936 |

OTHER REFERENCES

King, "The Hydrogenation-Cracking of Tars," Science of Petroleum, Oxford Univ. Press (1938), pages 2156–2163.